(12) United States Patent
Montero

(10) Patent No.: US 12,284,111 B2
(45) Date of Patent: Apr. 22, 2025

(54) SINGLE NODE MULTIPLE FORWARDING PATHS

(71) Applicant: Carrier Corporation, Palm Beach Gardens, FL (US)

(72) Inventor: Antonio Montero, Bradenton, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/248,765

(22) Filed: Feb. 5, 2021

(65) Prior Publication Data

US 2021/0273880 A1 Sep. 2, 2021

Related U.S. Application Data

(60) Provisional application No. 62/983,126, filed on Feb. 28, 2020.

(51) Int. Cl.
*H04L 45/16* (2022.01)
*H04L 45/00* (2022.01)
*H04L 45/28* (2022.01)

(52) U.S. Cl.
CPC ............ *H04L 45/16* (2013.01); *H04L 45/22* (2013.01); *H04L 45/28* (2013.01)

(58) Field of Classification Search
CPC ......... H04L 45/16; H04L 45/22; H04L 45/28; H04L 45/24
See application file for complete search history.

(56) References Cited

U.S. PATENT DOCUMENTS

| 7,826,348 | B2 | 11/2010 | Farinacci et al. |
| 7,944,811 | B2 | 5/2011 | Windisch et al. |
| 8,218,430 | B2 | 7/2012 | Zhao |
| 8,948,023 | B2 | 2/2015 | Ou |

(Continued)

FOREIGN PATENT DOCUMENTS

| EP | 2571201 A1 | 3/2013 | |
| EP | 3151488 A1 * | 4/2017 | ............ H04L 12/18 |
| EP | 3435595 A1 | 1/2019 | |

OTHER PUBLICATIONS

Extended European Search Report received for EP Application No. 21159732.3, mailed on Jul. 26, 2021, 12 Pages.

(Continued)

*Primary Examiner* — Donald L Mills
(74) *Attorney, Agent, or Firm* — CANTOR COLBURN LLP

(57) ABSTRACT

A node within a network including a plurality of interconnected nodes, and a method for operating a network that includes a plurality of interconnected nodes is provided. The network includes a primary path and an alternate path. Each path is respectively configured to connect a source node to a receiving node. The alternate path may include at least one more intermediate node than the primary path. Both the primary path and the alternate path are stored in a routing table. The data packets may be transmitted, substantially simultaneously, from the source node via the primary path and via the alternate path toward the receiving node. The data packets are accepted and forward by the receiving node. The determination of where to forward the data packets may be done locally by inspecting the incoming data packets.

17 Claims, 2 Drawing Sheets

(56) References Cited

U.S. PATENT DOCUMENTS

| | | | |
|---|---|---|---|
| 9,363,168 B2 | 6/2016 | Enyedi et al. | |
| 9,379,899 B2 | 6/2016 | Kannan et al. | |
| 9,590,889 B2 | 3/2017 | Mahadevan et al. | |
| 10,212,068 B2 | 2/2019 | Mahadevan et al. | |
| 10,243,841 B2 | 3/2019 | Gupta et al. | |
| 2012/0218996 A1* | 8/2012 | Das | H04L 45/22 |
| | | | 370/389 |
| 2013/0329546 A1* | 12/2013 | Wijnands | H04L 45/22 |
| | | | 370/244 |
| 2014/0016457 A1* | 1/2014 | Enyedi | H04L 45/28 |
| | | | 370/225 |
| 2014/0149602 A1 | 5/2014 | Madaiah et al. | |
| 2019/0268256 A1* | 8/2019 | Mirsky | H04L 43/10 |
| 2021/0144086 A1* | 5/2021 | Bidgoli | H04L 45/22 |

OTHER PUBLICATIONS

Karan et al.: "Multi cast only Fast Re-Route; draft-karan-mofrr-00. txt", Internet Engineering Task Force; Standardworkingdraft, Internet Society 4, Rue Des Falaises Ch-1205 Geneva, Switzerland, Mar. 2, 2009 (Mar. 2, 2009), XP015061465.

* cited by examiner

SINGLE NODE MULTIPLE FORWARDING PATHS

CROSS REFERENCE TO A RELATED APPLICATION

The application claims the benefit of U.S. Provisional Application No. 62/983,126 filed Feb. 28, 2020, the contents of which are hereby incorporated in their entirety.

BACKGROUND

Hazard detection systems (e.g., fire detection systems) typically include multiple control panels. Each control panel may be connected to one or more hazard detectors, notification devices (e.g., horns, strobes, annunciators, etc.), alarm triggers (e.g., pull stations, call points, door alarms, etc.), and other communicatively connected infrastructure. Often the control panels are configured to transmit information (e.g., as data packets) to one another in order to trigger an alarm (e.g., activating a notification device) in the event a hazard (e.g., a fire) is detected (e.g., by a hazard detector). Ideally this alarm is triggered as close to the detection of the hazard as possible.

To ensure that the hazard detection system is capable of transmitting the information (e.g., from the control panel where the hazard is detected to the control panel that triggers the alarm) in the event of a fault or break in the primary transmission path, alternate transmission paths are typically incorporated. However, the conventional method of utilizing these alternate transmission paths are insufficient to meet the requirements of the Underwriter Laboratories (UL) S524-19 and S527-19 standards, which are applicable to the fire detection systems and required for compliance with many local building codes and standards. These standards require the fire detection system to be able to trigger an alarm within ten seconds of detection, regardless of which transmission path (i.e. the primary path or the alternate path) is utilized.

Conventional methods of utilizing alternate paths require (i) the initial establishment of the primary transmission path and the alternate transmission path; (ii) the storing of the alternate path (e.g., in a routing table); (iii) the detection of a failure in the primary transmission path; and (iv) the switching from the primary transmission path to the alternate transmission path. This means that the information is not transmitted over the alternate transmission path until a failure is detected and the switch is made. This methodology of utilizing the alternate path following a failure of the primary path failure has the potential to waste valuable time, which may ultimately delay the triggering of the alarm (e.g., the activating one or more notification devices).

Accordingly, there remains a need for a network that utilizes an alternate path in a more efficient manner.

BRIEF DESCRIPTION

According to one embodiment, a method for operating a network including a plurality of interconnected nodes is provided. The method includes a step for determining a primary path configured to connect a source node to a receiving node, and an alternate path configured to connect the source node to the receiving node. The primary path and the alternate path are stored in a routing table. The method also includes a step for transmitting, substantially simultaneously, data packets from the source node via the primary path and via the alternate path toward the receiving node. The data packets from both the primary path and the alternate path being accepted and forwarded by the receiving node.

In accordance with additional or alternative embodiments, the method further includes processing, in the receiving node, an earliest received data packet.

In accordance with additional or alternative embodiments, the method further includes inspecting, in the receiving node, the data packet to determine whether the data packet was transmitted via the primary path or the alternate path.

In accordance with additional or alternative embodiments, the network includes at least one intermediate node, the alternate path including at least one more intermediate node than the primary path.

In accordance with additional or alternative embodiments, the receiving node is configured to forward the data packet along at least one of the primary path and the alternate path to at least one intermediate node.

In accordance with additional or alternative embodiments, each intermediate node is configured to process an earliest received data packet.

In accordance with additional or alternative embodiments, the data packet received via the primary path is forwarded towards the alternate path.

In accordance with additional or alternative embodiments, the data packet received via the alternate path is forwarded towards the primary path.

In accordance with additional or alternative embodiments, each intermediate node is configured to inspect the data packet to determine whether the data packet was transmitted via the primary path or the alternate path.

In accordance with additional or alternative embodiments, each intermediate node is configured to forward the data packet along at least one of the primary path and the alternate path.

In accordance with additional or alternative embodiments, using the routing table includes configuring PIM (Protocol Independent Multicasting) to use the routing table.

According to another aspect of the invention a method for operating a network including a plurality of interconnected nodes is provided. The method includes a step for determining a primary path configured to connect a unicast node to a receiving node, and an alternate path configured to connect the unicast node to the receiving node. The primary path and the alternate path each respectively stored in a routing table. The unicast node is configured to transmit a data packet to a multicast node. The method also includes a step for transmitting, substantially simultaneously, data packets from the multicast node via the primary path and via the alternate path toward the receiving node, wherein the data packets from both the primary path and the alternate path are accepted by the receiving node, and only the data packets received from one of the primary path or the alternate path are forwarded by the receiving node. The determination of whether the data packet is forwarded via the primary path or the alternate path is made in the receiving node.

In accordance with additional or alternative embodiments, the method further includes processing, in the receiving node, an earliest received data packet.

In accordance with additional or alternative embodiments, the network includes at least one intermediate node, the alternate path including at least one more intermediate node than the primary path.

In accordance with additional or alternative embodiments, the receiving node inspects the data packet to determine whether to forward the data packet via the primary path or the alternate path.

In accordance with additional or alternative embodiments, the data packet is forwarded from the receiving node via the alternate path if the data packet was transmitted from the unicast node via the primary path.

In accordance with additional or alternative embodiments, the method further includes determining, in the receiving node, a network failure in the primary path when the data packet is transmitted to the receiving node only via the alternate path for at least a time period.

In accordance with additional or alternative embodiments, the time period is at least four (4) seconds.

In accordance with additional or alternative embodiments, the receiving node forwards the data packet via the alternate path if a network failure in the primary path is determined.

In accordance with additional or alternative embodiments, using the routing table includes configuring PIM (Protocol Independent Multicasting) to use the routing table.

According to another aspect of the disclosure a node within a network including a plurality of interconnected nodes is provided. The node includes a first port for receiving a first data packet, a second port for receiving a second data packet, the second data packet being substantially similar to the first data packet, and a processor for inspecting the first data packet and the second data packet. The node is configured to forward the first data packet from the second port and the second data packet from the first port.

In accordance with additional or alternative embodiments, the first data packet and the second data packet originate from a multicast node.

In accordance with additional or alternative embodiments, an earliest received data packet is processed.

According to another aspect of the disclosure a node within a network including a plurality of interconnected nodes is provided. The node includes a first port for receiving a first data packet, a second port for receiving a second data packet, the second data packet being substantially similar to the first data packet, and a processor for inspecting the first data packet and the second data packet. The node is configured to only forward one of the first data packet or the second data packet. The data packet being forwarded is forwarded from an opposite port from which the data packet is received.

In accordance with additional or alternative embodiments, the wherein the first data packet and the second data packet originate from a unicast node.

In accordance with additional or alternative embodiments, an earliest received data packet is processed.

In accordance with additional or alternative embodiments, the processor inspects each data packet to determine whether each data packet was received at the first port or the second port.

In accordance with additional or alternative embodiments, a network failure is determined when only data packets are received at the second port for at least a time period.

In accordance with additional or alternative embodiments, the time period is at least four (4) seconds.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Figure 1:
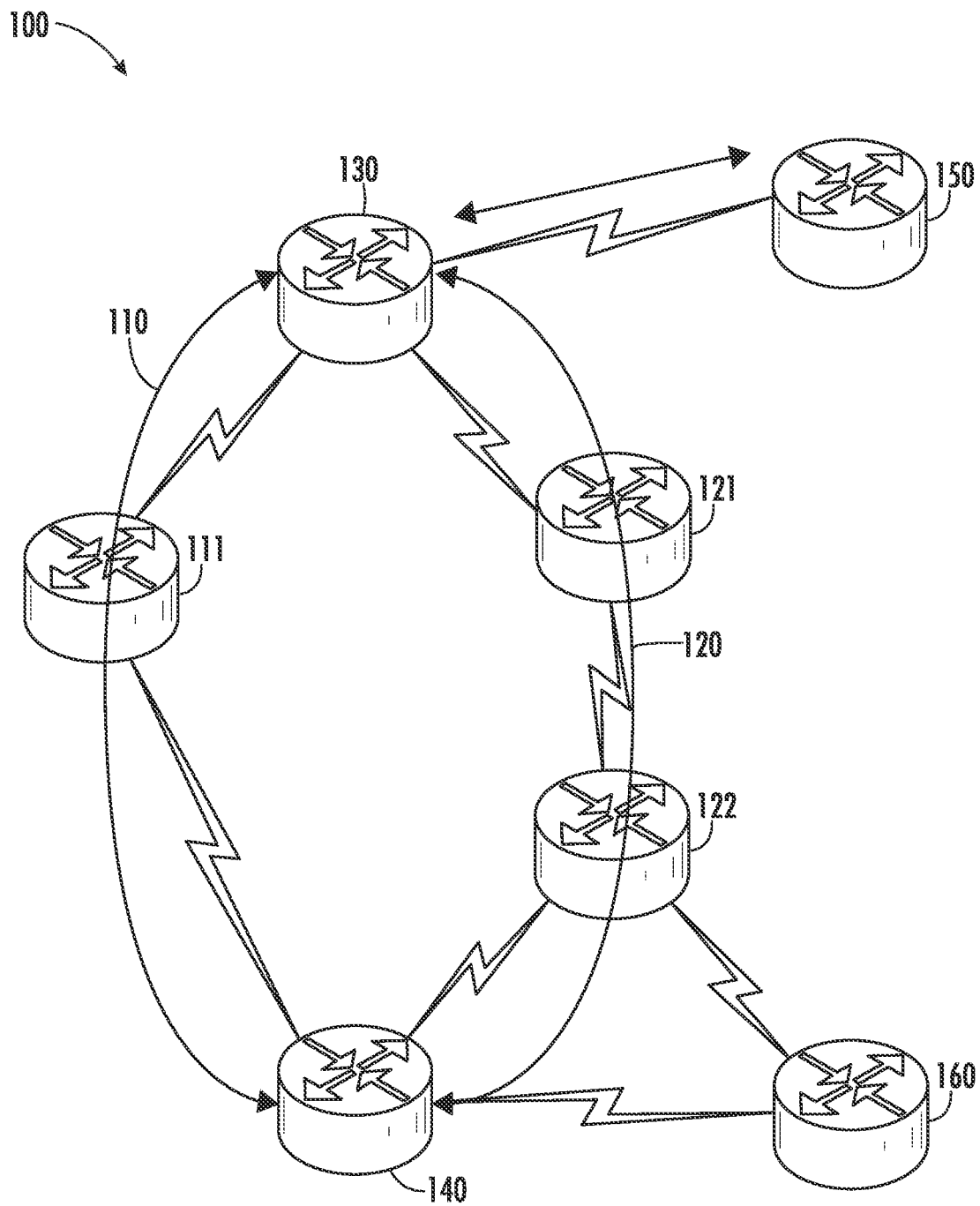
FIG. 1 is a schematic illustration of a network including a plurality of interconnected nodes in accordance with one aspect of the disclosure.

Hazard detection systems are configured to detect the presence of a hazard (e.g., a fire, carbon monoxide, etc.) in a particular environment (e.g., office buildings, apartment buildings, etc.). These systems may include multiple interconnected control panels, at least one of which is configured to trigger an alarm after a hazard is detected by a hazard detector. For example, a hazard detector communicatively connected to one control panel may detect the presence of a hazard within the environment, and this control panel may communicate the presence of the hazard (e.g., by transmitting a data packet) to another control panel where the alarm is triggered (e.g., using one or more notification devices). To transmit data packets, these control panels, in certain instances, may be connected through one or more physical link(s) (e.g., hard-wired), and/or may be connected through one or more wireless connection(s) (e.g., using Wi-Fi, Bluetooth, Bluetooth Low Energy (BTLE), Zigbee, infrared, or cellular).

Each of the control panels may be viewed as nodes within an interconnected network. For example, as stated above, to trigger the alarm, a data packet may have to be transmitted (e.g., through one or more wired or wireless connections) from a control panel (e.g., a source node) where the hazard is detected to a control panel (e.g., a receiving node) that is triggering the alarm (e.g., activating the one or more notification devices). To detect the presence of a hazard within the environment, each of the control panels may be distributed across the environment such that if a hazard (e.g., a fire) occurs at least one of the control panels, through connection with one or more hazard detectors, will be able to detect the hazard, and transmit a signal (e.g., as a data packet), through one or more wired or wireless connections, toward the control panel triggering the alarm. In order for the signal to reach the control panel that is triggering the alarm, the signal may be transmitted from one control panel to another all the way to the control panel triggering the alarm. To help mitigate potential failure of a given transmission path, there are often redundant transmission paths built into the hazard detection systems. As can be assumed, it is vitally important for the signal to reach the control panel that is triggering the alarm in a time efficient manner so that the alarm can be triggered as close to the detection of the hazard (e.g., the fire) as possible.

Underwriter Laboratories (UL) S524-19 and S527-19 standards require fire detection systems to be able to trigger an alarm within ten seconds of detection, regardless of which transmission path (i.e. the primary path or the alternate path) is utilized. To meet this requirement the fire detection system should be configured to reduce any delay of path utilization. For example, instead of requiring a detection of a failure in one path and a subsequent switching of which transmission path is utilized, it may be beneficial, in at least certain instances, to configure the network such that both a primary path and an alternate path are utilized all the time. This may prevent unnecessary downtime in the event of a failure in the primary path.

In certain instances, the network and method of operating the network may provide for zero (0) extended delay in data propagation (e.g., signal transmission) upon any path in the network failing. Zero extended delay may be interpreted to mean that the network and method of operating the network do not require any additional delay, which could be seen as a result establishing and/or switching to an alternate path following a network failure. The network and method of operating the network may provide for zero (0) extended delay in data propagation, at least in part, because the network and method of operating the network do not require the establishing or switching to an alternate path following a network failure in the primary path. For example, if there is a failure in the primary path, the data packet will still be transmitted via the alternate path without having to establish or switch to the alternate path, as the network and method of operating the network provide for the transmission of the data packet substantially simultaneously via both the primary path and the alternate path. Although the method of operating the network has been described herein in relation to its use within a hazard detection system, it should be noted that the method may be capable of being used within any interconnected network of nodes.

With reference now to the Figures, a schematic illustration of a network 100 including a plurality of interconnected nodes 130, 150, 121, 122, 160, 140, 111 is shown in FIG. 1. Each node may include one or more network interfaces, for transmitting and/or receiving data packets, processor(s), and a memory (ies) for storing information. The memory may include any one or combination of volatile memory elements (e.g., random access memory (RAM), non-volatile memory elements (e.g., ROM, etc.)), and/or have a distributed architecture (e.g., where various components are situated remotely from one another, but can be accessed by the processor). The memory storage may include information related to received/transmitted data packets. The processor within each node may be configured to execute software stored within the memory of each node, and may be configured to generally control the operations of the node of which it is incorporated, including operations to inspect incoming data packets. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

In certain instances, the network 100 is described in terms of source node 130 being the data packet originating source. Source node 130 may, in certain instances, be a multicast node. A multicast node may be a node with more than one source. Meaning that node 130 may have multiple sources for transmitting and receiving data packets.

The network 100 may be configured to use reverse path forwarding (RPF) to ensure loop-free forwarding of data packets. The network 100 may use RPF with a multicast protocol (e.g., protocol independent multicast (PIM)), which may be configured to be in dense mode, sparse mode, bi-directional, source-specific, and/or mixed mode. PIM is a protocol that may be used for building up and maintaining multicast trees in networks. With respect to joining source node 130, in PIM, each node 150, 121, 122, 160, 140, 111 may transmit a JOIN message upstream toward source node 130. In certain instances, each node 150, 121, 122, 160, 140, 111 may transmit JOIN messages to only upstream direct local neighboring nodes, which may be determined by a routing table (e.g., a multicast or unicast routing table).

A routing table is a data table stored in a router or a network host that lists the routes (e.g., potential paths) for where to send data packets in order for the data packets to arrive at particular network destinations (e.g., at a particular node). The routing table may be viewed as a map of the network 100 that lists different nodes that are next in line to receive a data packet. When a node receives a data packet, the node references the routing table to know where to send that data packet in order for the data packet to arrive at a particular node. For example, if the node is not directly connected to the node that needs to receive the data packet, then the node may have to send the data packet to an intermediate node before it can arrive at the particular node. A multicast routing table may be used to transmit data packets directly from or directly to a multicast node (e.g., a multicast routing table may provide multiple paths for transmitting the data packet). A unicast routing table may be used to transmit data packets directly from or directly to a unicast node (e.g., a unicast routing table may provide only one path for transmitting the data packet). Regardless of whether the routing table is a multicast routing table or a unicast routing table, the routing table may be built and stored in a router or network host when the network 100 is being designed, and may be updated, as described above, as nodes join and/or leave the network 100.

These routing tables may be referenced when the JOIN messages are transmitted to the upstream direct local neighboring nodes. An upstream direct local neighboring node may be a node directly upstream the transmission path of the node joining the network 100. For example, from the perspective of receiving node 140 joining source node 130, receiving node 140 may reference the multicast routing table and transmit a JOIN message to both intermediate node 111 and intermediate node 122. Intermediate node 111 and intermediate node 122 may both independently reference the multicast routing table and transmit JOIN messages upstream toward source node 130 (e.g., intermediate node 111 may transmit a JOIN message directly to source node 130, and intermediate node 122 may transmit a JOIN message to intermediate node 121). Intermediate node 122 may reference the multicast routing table and transmit a JOIN message to source node 130.

Each node that receives the JOIN message will process the JOIN message and install/update the corresponding routing table information (e.g., intermediate node 111 and intermediate node 122 will process the JOIN message from 140 and will install/update the corresponding routing table information to include receiving node 140). Once updated, the routing table may store both a primary path 110 and an alternate path 120 for transmitting data packets from source node 130 to receiving node 140.

FIG. 1 shows a network 100 with a primary path 110 and an alternate path 120. The primary path 110 and the alternate path 120 may be used to transmit data packets from the source node 130 to a receiving node 140 (e.g., utilizing different intermediate nodes 111, 121, 122). In certain instances the alternate path 120 is longer than the primary path 110 (e.g., the alternate path 120 may include at least one more intermediate node 121, 122 than the primary path 110). For example, in certain instances, the primary path 110 may include at least one intermediate node 111, and the alternate path 120 may include at least two intermediate nodes 121, 122. However, in certain instances, only the alternate path 120 includes an intermediate node 121, 122, and there are no intermediate nodes along the primary path 110 (e.g., the source node 130 and the receiving node 140 may be directly connected along the primary path 110).

As described above, both the primary path 110 and the alternate path 120 may be stored in a routing table. By configuring the network 100 to include both a primary path 110 and an alternate path 120, the network 100 may be able to mitigate any fault in the primary path 110. A failure or fault in a path (e.g., in the primary path 110) may be viewed as a break in a link, network fault, node rebooting, or anything that may prevent the transmission of a data package over the path.

In certain instances, data packets are transmitted substantially simultaneously from the source node 130 via the primary path 110 and via the alternate path 120 toward the receiving node 140. Substantially simultaneously may be interpreted to mean that data packets are transmitted via each path 110, 120 within a close time interval of one another. For example, within a few milliseconds of one another. In certain instances, data packets are transmitted substantially simultaneously from the source node 130 via the both paths 110, 120 even when there is a fault in one of the paths 110, 120.

The receiving node 140 may be configured to accept and forward both data packets (e.g., accepting both the data packet from the primary path 110 and the data packet from the alternate path 120). The receiving node 140 may be configured to process only the earliest received data packet, which may, in certain instances, be the data packet received via the primary path 110 (e.g., when there is not a fault in the primary path 110). The receiving node 140 may be configured to forward the data packets received via the primary path 110 along the alternate path 120, and forward the data packets received via the alternate path 120 along the primary path 110.

As described above, the network 100 utilizes both paths 110, 120 even prior to any failure. Using both paths 110, 120 in normal operating conditions prevents unnecessary downtime in the event of a failure in the primary path 110 (e.g., by not requiring a detection of a failure and subsequent switching to the alternate path 120). Operating the network 100 using both primary path 110 and alternate path 120 enables the triggering of an alarm for a fire detection system within ten (10) seconds of detection of a hazard (e.g. a fire) at all times, even in the event of a network 100 failure. For example, if the receiving node 140 is viewed as the control panel that triggers the alarm, and the source node 130 is viewed as the control panel where the hazard (e.g., a fire) is detected, regardless of whether a failure occurs in one of the transmission paths 110, 120 network 100 is able to prevent unnecessary delay in the transmission of the data packet from source node 130 to receiving node 140 by transmitting and forwarding data packets substantially simultaneously along both paths 110, 120.

Each node 130, 150, 121, 122, 160, 140, 111 may be able to independently inspect any incoming data packet to determine the source of the data packet. This may mean that each node 130, 150, 121, 122, 160, 140, 111 may not rely on a link state or message from an adjacent node. For example, the receiving node 140 may be able inspect the data packet that originated from the source node 130 to determine whether the data packet was transmitted via the primary path 110 or the alternate path 120. This inspection of the data packet may inform the node completing the inspection where to forward the data packet. Inspecting the data packet may include, but is not limited to, using reverse path forwarding (RPF), the appropriate routing table, and the interface at which the data packet was received. When RPF is enabled, each node 130, 150, 121, 122, 160, 140, 111 that receives a data packet may inspect the data packet to make sure that the source address (e.g., indicating where the data packet originated) and the interface (e.g., port) on which the data packet was received appear in the routing table. The interface may be the particular location where the data packet was received (e.g., which port the data packet was delivered). For example, intermediate node 121 may inspect a data packet from source node 130 and determine the source address was the source node 130, the destination address is any node (e.g., intermediate node 122) along the path (e.g., the alternate path 120) leading to the receiving node 140, and the interface where the data packet was received was a particular port (e.g., eth0 for the first Ethernet port). If this path does not already appear in the multicast routing table the node may update the particular routing table.

Each node 130, 150, 121, 122, 160, 140 may perform reverse path forwarding (RPF), using a routing table and the interface at which the data packet was received, to determine where the data packet needs to be sent next. As described above, where to send the data packet may be based on, at least in part, the source of the data packet, the information in the routing table, and the interface at which the data packet was received. This information may be discovered by the node while inspecting the data packet. If the node receiving the data packet is not directly connected to the receiving node 140, the data packet may have to be inspected and forwarded to at least one intermediate node 111, 121, 122 before it can be received by the receiving node 140.

Each intermediate node 111, 121, 122 may be configured to process an earliest received data packet. Meaning that each intermediate node 111, 121, 122 may only process the data packet once. Each intermediate node 111, 121, 122 may forward the data packet in the opposite direction from which it is received. Once received by the receiving node 140 the receiving node 140 forwards the data packet, in an opposite fashion (e.g., a data packet received by the receiving node 140 via the primary path 110 may be forwarded to at least one intermediate node 122 along the alternate path 120, and a data packet received by the receiving node via the alternate path 120 may be forwarded to at least one intermediate node 111 along the primary path 110). When the data packet arrives back at the source node 130 the source node 130 may not process the data packet and may not forward the data packet in either direction. This may effectively stop the processing and forwarding of the data packet at the source, which may help prevent data loops (e.g., by "breaking the loop" at the source).

As shown in FIG. 1, there may be instances where a node (e.g., intermediate node 122) receives a duplicative data packet. Intermediate node 122 may receive the same data packet from receiving node 140 and node 160. For example, the data packet may be transmitted from the source node 130, where the data packet originates, to an intermediate node 111. The data packet may then be forwarded from the intermediate node 111 to the receiving node 140, and forwarded from the receiving node 140 both to intermediate node 122 and to node 160. Node 160 may forward the data packet to intermediate node 122. With intermediate node 122 receiving duplicative data packets (e.g., from both receiving node 140 and node 160), intermediate node 122 may only process and forward one of the data packets (e.g., toward intermediate node 121) and may drop the other data packet (e.g., the duplicative data packet). In certain instances, only the earliest received data packet is processed and forwarded. For example, intermediate node 122, when receiving duplicative data packets may be configured to only process and forward the earliest received data packet (e.g., the data packet from receiving node 140), and drop the duplicative data packet (e.g., the later received data packet from node 160).

The above description was given in terms of source node 130, a multicast node, being the data packet originating source. However, in certain instances, the network 100 may include one or more unicast node 150, which, in certain instances, may be where the data packet originates (e.g., viewed as the source of the data packet). A unicast node may be a node with only one source. Meaning that node 150 may have only one source for transmitting or receiving data packets. The unicast node 150 may transmit the data packet to node 130 (e.g., through a single wired or wireless connection). Node 130, which is a multicast node, may inspect and forward the data packet toward the receiving node 140 (e.g., via both the primary path 110 and the alternate path 120). The receiving node 140 may inspect and forward the incoming data packets in the opposite direction from which is it received (e.g., forwarding data packets from the primary path 110 via the alternate path 120).

As with the multicast node 130, the forwarding of the data packets stops when the data packet arrives back at the source (e.g., the unicast node 150). When arriving back at the source, the unicast node 150 may not process the data packet and may not forward the data packet. This may effectively stop the processing and forwarding of the data packet at the source, which may help prevent data loops (e.g., as described above, by "breaking the loop" at the source). The determination of where to forward the incoming data packets may be done locally (e.g., by the receiving node 140) by inspecting the incoming data packets and referencing a routing table.

Inspecting the incoming data packets may help the determination of a network fault (e.g., in the primary path 110). For example, the receiving node 140 may be configured to inspect an incoming data packet to determine whether the data packet was transmitted via the primary path 110 or the alternate path 120. With the source of the data packet being the unicast node 150 the receiving node 140 may forward only the data packets received from one of the paths 110, 120. In instances where there is a fault in the primary path 110, the receiving node 140 may only receive the data packet via the alternate path 120. The receiving node 140, by inspecting the incoming data packet, may be able to determine that because the data packet was only received via the alternate path 120 there is a fault in the primary path 110. When there is a fault in the primary path 110, the receiving node 140 may forward the data packets that are received from the unicast node 150 via the alternate path 120 via the primary path 110.

By inspecting the incoming data packet locally (e.g., in the receiving node 140), the receiving node 140 may able to determine a network 100 failure (e.g., in the primary path 110) without relying on information from an adjacent node (e.g., without relying on a link state or message from an adjacent node). This determination of a network 100 failure may be based on an inspection of incoming data packets over a given time period. For example, the receiving node 140 may inspect incoming data packets for a time period to see whether all data packets are coming in via the primary path 110 or the alternate path 120. By inspecting data packets over a time period, the information regarding the source of the data packets is able to accumulate, which may provide a better indication as to whether a path (e.g., the primary path 110 or the alternate path 120) has failed.

The time period for which the receiving node 140 collects the information regarding the source of the incoming data packets may in certain instances be at least four (4) seconds. Meaning that if incoming data packets are only being received via the alternate path for at least four (4) seconds, the receiving node 140 may determine a failure in the primary path 110. In certain instances, the time period is at least one (1) second, at least two (2) seconds, at least three (3) seconds, at least four (4) seconds, at least five (5) seconds, at least six (6) seconds, at least seven (7) seconds, at least eight (8) seconds, at least nine (9) seconds, at least ten (10) seconds, or any time period capable of providing a sufficient indication of a trend in the transmission of data packets.

Operating the network 100 in the above described manner may prevent unnecessary downtime of the network 100 in the event of a failure in the primary path 100, which may help ensure that Underwriter Laboratories (UL) S524-19 and S527-19 standards are satisfied. For example, the method may ensure that the hazard detection system is able to trigger an alarm within ten seconds of detection, regardless of which transmission path (i.e. the primary path 110 or the alternate path 120) is utilized.

Figure 2:
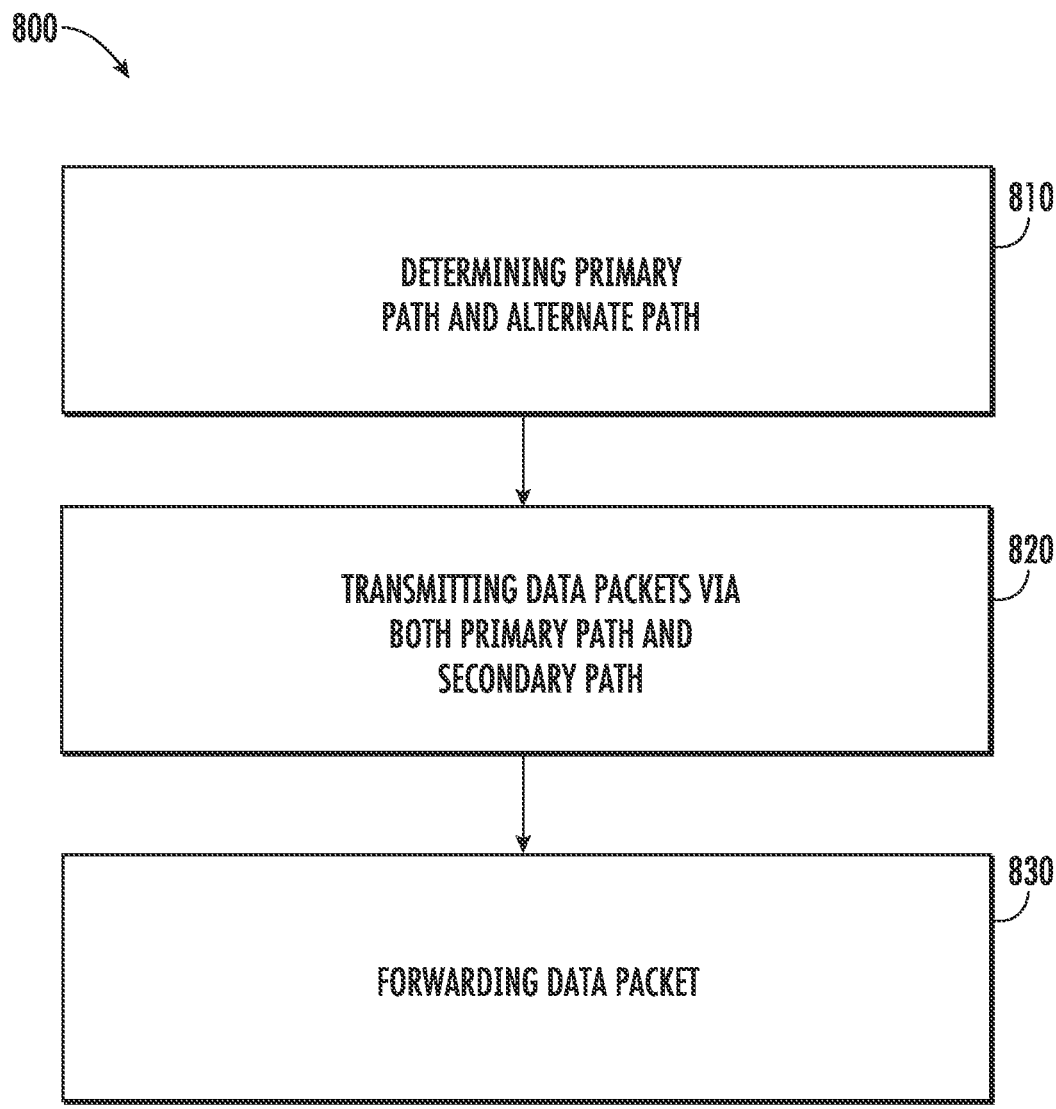
FIG. 2 is flow diagram illustrating a method of operating a network including a plurality of interconnected nodes in accordance with one aspect of the disclosure.

The method for operating a network including a plurality of interconnected nodes is illustrated in FIG. 2. This method may be completed using the exemplary network 100 shown in FIG. 1. As shown in FIG. 2, the method 800 includes step 810 of determining a primary path 100, and an alternate path 120. This determination of the primary path 110 and the alternate path 120 may be completed via the JOIN message methodology described above. The primary path 110 and the alternate path 120 each may be configured to connect the receiving node 140 to a multicast node 130 and/or a unicast node 150. As described above, the primary path 110 and the alternate path 120 may be stored in a routing table.

The method 800 further includes step 820 of transmitting, substantially simultaneously, data packets from the source node 130 via the primary path 110 and via the alternate path 120 toward the receiving node 140, wherein the data packets from both the primary path 110 and the alternate path 120 are accepted by the receiving node 140. The method 800, in certain instances, may include step 830 of forwarding the data packet from the receiving node 140 via the primary path 110 and/or the alternate path 120. For example, the receiving node 140 may forward the data packets received via the primary path 110 along the alternate path 120, and may forward the data packets received via the alternate path 120 along the primary path 110. If the source of the data packet is a multicast node 130 the receiving node 140 may forward the data packet along both the primary path 110 and the alternate path 120 (e.g., in the opposite direction from which it is received). If the source of the data packet is a unicast node 150 the receiving node 140 may forward only data packets from one of the paths (e.g., only forward data packets received via the primary path 110 along the alternate path 120). The determination of whether the data packet is forwarded via the primary path 110 or the alternate path 120 is made in the receiving node 140. This determination of where to forward the data packet may be completed by inspecting the incoming data packet locally (e.g., the inspection of the data packet may be performed in the receiving node 140).

This method 800 of operating a network 100 may be able to prevent unnecessary downtime of the network 100 in the event of a failure in the primary path 110, while also avoiding increasing bandwidth within the network 100. Bandwidth is measured as the maximum rate of data transfer across a given path. The method 800 of which the network 100 is operated may not increase transmission over a single path (e.g., over either the primary path 110 or the alternate path 120) in the network 100. Instead of increasing the number of data packets transmitted over a single path, which would increase bandwidth, the method 800 of operating the network 100 provides for transmitting data packets substantially simultaneously over separate paths, namely, the primary path 110 and the alternate path 120. Bandwidth increase may also be prevented, at least in part, by preventing loops from occurring within the network 100. As described above, the network 100 may be configured to use reverse path forwarding (RPF) to ensure loop-free forwarding of data packets.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the embodiments. When implemented on a general-purpose microprocessor, the computer program code segments configure the microprocessor to create specific logic circuits.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for operating a network comprising a plurality of interconnected nodes, the method comprising:
   determining a primary path configured to connect a source node to a receiving node, and an alternate path configured to connect the source node to the receiving node, the primary path and the alternate path being stored in a routing table;
   transmitting a first data packet from the source node via the primary path and transmitting substantially simultaneously a second data packet, the second data packet being substantially similar to the first data packet via the alternate path toward the receiving node, wherein the first and second data packets received from both the primary path and the alternate path are accepted and forwarded by the receiving node;
   inspecting, in the receiving node, a data packet for a predefined time period to determine whether the data packet was transmitted via the primary path or the alternate path; and
   determining, in the receiving node, a network failure in the primary path when the data packet is transmitted to the receiving node only via the alternate path for the predefined time period.

2. The method of claim 1, further comprising processing, in the receiving node, an earliest received data packet.

3. The method of claim 1, wherein the network comprises at least one intermediate node, the alternate path comprising at least one more intermediate node than the primary path.

4. The method of claim 3, wherein the receiving node is configured to forward a data packet along at least one of the primary path and the alternate path to the at least one intermediate node, and wherein each intermediate node is configured to process an earliest received data packet.

5. The method of claim 4, wherein if a data packet is received via the primary path, the data packet is forwarded towards the alternate path, and if the data packet is received via the alternate path, the data packet is forwarded towards the primary path.

6. The method of claim 4, wherein each intermediate node is configured to inspect the data packet to determine whether the data packet was transmitted via the primary path or the alternate path.

7. A method for operating a network comprising a plurality of interconnected nodes, the method comprising:
   determining a primary path configured to connect a unicast node to a receiving node, and an alternate path configured to connect the unicast node to the receiving node, the primary path and the alternate path each respectively stored in a routing table, the unicast node configured to transmit data packets to a multicast node;
   transmitting a first data packet from the multicast node via the primary path and transmitting substantially simultaneously a second data packet, the second data packet being substantially similar to the first data packet via the alternate path toward the receiving node, wherein the first and second data packets from both the primary path and the alternate path are accepted by the receiving node, and only the data packets received from one of the primary path or the alternate path are forwarded by the receiving node,
   wherein the determination of whether the data packet forwarded is from the primary path or the alternate path is made in the receiving node, and wherein each data packet is inspected in the receiving node for a predefined time period to determine whether to forward the data packet via the primary path or the alternate path; and
   determining, in the receiving node, a network failure in the primary path when the data packet is transmitted to the receiving node only via the alternate path for the predefined time period.

8. The method of claim 7, further comprising processing, in the receiving node, an earliest received data packet.

9. The method of claim 7, wherein the network comprises at least one intermediate node, the alternate path comprising at least one more intermediate node than the primary path.

10. The method of claim 7, wherein the data packet is forwarded from the receiving node via the alternate path if the data packet was transmitted from the unicast node via the primary path.

11. The method of claim 7, wherein the receiving node forwards the data packet via the alternate path if the network failure in the primary path is determined.

12. A node within a network comprising a plurality of interconnected nodes, the node comprising:
- a first port for receiving a first data packet;
- a second port for receiving a second data packet, the second data packet being substantially similar to the first data packet, wherein the first data packet and the second data packet are transmitted substantially simultaneously; and
- a processor for inspecting the first data packet and the second data packet to determine whether the data packet was transmitted from the first port or the second port,
- wherein the first data packet is forwarded from the second port and the second data packet is forwarded from the first port, wherein the processor inspects each data packet for a predefined time period to determine whether each data packet was received at the first port or the second port, and wherein a network failure is determined when data packets are received only at the second port for the predefined time period.

13. The node of claim 12, wherein the first data packet and the second data packet originate from a multicast node.

14. The node of claim 12, wherein an earliest received data packet is processed.

15. A node within a network comprising a plurality of interconnected nodes, the node comprising:
- a first port for receiving a first data packet;
- a second port for receiving a second data packet, the second data packet being substantially similar to the first data packet, wherein the first data packet and the second data packet are transmitted substantially simultaneously; and
- a processor for inspecting the first data packet and the second data packet to determine whether the data packet was transmitted from the first port or the second port,
- wherein only one of the first data packet or the second data packet are forwarded, the data packet being forwarded from an opposite port from which the data packet is received, wherein the processor inspects each data packet for a predefined time period to determine whether each data packet was received at the first port or the second port, and wherein a network failure is determined when data packets are received only at the second port for the predefined time period.

16. The node of claim 15, wherein the first data packet and the second data packet originate from a unicast node.

17. The node of claim 15, wherein an earliest received data packet is processed.

* * * * *